(12) United States Patent
Kurimoto et al.

(10) Patent No.: US 7,376,405 B2
(45) Date of Patent: May 20, 2008

(54) RECEIVER CIRCUIT

(75) Inventors: Hidehiko Kurimoto, Takarazuka (JP);
Makoto Nakamura, Kyoto (JP);
Tomonori Nakajima, Chuo-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 484 days.

(21) Appl. No.: 11/041,868

(22) Filed: Jan. 25, 2005

(65) Prior Publication Data

US 2005/0186932 A1 Aug. 25, 2005

(30) Foreign Application Priority Data

Jan. 26, 2004 (JP) .............................. 2004-017173

(51) Int. Cl.
*H04B 1/00* (2006.01)
(52) U.S. Cl. .................... 455/232.1; 455/296; 455/324
(58) Field of Classification Search .................... None
See application file for complete search history.

(56) References Cited

U.S. PATENT DOCUMENTS

| 5,724,653 | A | * | 3/1998 | Baker et al. ................. 455/296 |
| 6,498,929 | B1 | * | 12/2002 | Tsurumi et al. ............. 455/296 |
| 6,826,388 | B1 | | 11/2004 | Tanaka et al. |
| 2007/0111688 | A1 | * | 5/2007 | Ueno et al. ................. 455/130 |

FOREIGN PATENT DOCUMENTS

JP 2001211098 8/2001

* cited by examiner

*Primary Examiner*—Thanh Cong Le
(74) *Attorney, Agent, or Firm*—Dickinson Wright, PLLC

(57) ABSTRACT

Interruption of a reception signal is achieved by placing a first low noise amplifier into the sleep state, and short-circuiting a shunt switch provided between differential input terminals of a second low noise amplifier during a DC offset canceling period. Further, an antenna switch is switched to a circuit system where DC offset canceling is not performed for preventing the input of the reception signal to a circuit system where DC offset canceling is performed.

9 Claims, 4 Drawing Sheets

RECEIVER CIRCUIT

BACKGROUND OF THE INVENTION

1. Field of the Invention

The present invention relates to a wireless communication receiver circuit of a direct conversion system. In particular, the present invention relates to a wireless communication receiver circuit which has a DC offset canceling function.

2. Description of Related Art

Conventional signal processing systems used in wireless communication for cellular phones or the like include a superheterodyne system. In such a superheterodyne system, a process of downconverting of a reception signal to an intermediate frequency is temporarily required, and thus, the circuit scale is large.

In recent years, as a solution of this problem, a direct conversion system has been developed wherein downconversion into the intermediate frequency is not necessary. However, in the direct conversion system, the output of the DC offset to the next stage is amplified undesirably when a DC offset is present in a reception signal path.

A solution of this problem presents a DC offset canceling method. A receiver circuit carrying out this method has a structure, for example, as shown in FIG. 3. Specifically, the receiver circuit includes a duplexer 101, a first low noise amplifier 102, a band pass filter 103 comprising a SAW (surface acoustic wave) filter, a second low noise amplifier 104, demodulators 105_1, 105_2 comprising mixers, a local oscillator 106, a control logic circuit 107, gain control amplifiers 108_1, 108_2, DC offset canceling circuits 109_1, 109_2, lowpass filters 110_1, 110_2, and a base band block 111. Posterior the demodulators 105_1, 105_2, the circuit is separated into two signal paths for carrying out the signal processes of the in-phase component and the quadrature component separately.

In the receiver circuit having the above structure, the DC offset canceling circuits 109_1, 109_2 respectively connect the input ends to the output ends of the gain control amplifiers 108_1, 108_2. The DC offset canceling circuits 109_1, 109_2 calibrate the DC offset at the input portions of the gain control amplifiers 108_1, 108_2.

The control logic circuit 107, being connected to a local oscillator 106, outputs a frequency control signal for controlling the oscillating frequency. The frequency control signal, being inputted to the local oscillator 106, defines the oscillating frequency in the local oscillator 106. At the time of starting the DC offset canceling operation, the control logic circuit 107 outputs a DC offset canceling signal. The DC offset canceling signal is inputted to the DC offset canceling circuits 109_1, 109_2, and the DC offset canceling operation by the DC offset canceling circuits 109_1, 109_2 starts.

FIG. 4 shows a specific example of a DC offset canceling circuit disclosed in Japanese Laid-Open Patent Publication No. 2001-211098. As shown in FIG. 4, in the DC offset canceling circuit 109_1, the DC offset component at the output of the gain control amplifier 108_1 is read and digitalized by an AD converter 401, and inputted to a control circuit 402. Thereafter, based on a digital signal corresponding to the inputted DC offset component, the control circuit 402 outputs a calibration signal to the DA converter 403 as a digital signal for canceling the DC offset. The DA converter 403 converts the inputted calibration signal to an analog signal and outputs to the gain control amplifier 108_1. Thus, the DC offset voltage at the output of the gain control amplifier 108_1 is calibrated, and the DC offset is cancelled.

As shown in FIG. 4, at the time of canceling the DC offset, the DC offset is detected at the output portion of the gain control amplifier 108_1. When a reception signal is present at the time of detecting the DC offset, an AC voltage is superimposed on the offset potion of the DC voltage. Therefore, during the DC offset canceling operation period, it is not possible to detect only the DC offset if the reception signal is present. Therefore, the accuracy in the DC offset canceling operation is low.

SUMMARY OF THE INVENTION

An object of the present invention is to provide a receiver circuit that makes it possible to improve an accuracy in the DC offset canceling operation.

To achieve the object, it needs either no reception signal present in a signal path during a period wherein the DC offset voltage value is detected or the amplitude is sufficiently small even if the reception signal is present in the signal path. According to the present invention, no reception signal is intend to present at the period of the DC offset canceling detection.

In a receiver circuit of this invention, it adopts a structure that prevents an inputting of the reception signal to the DC offset canceling circuit that may cause a deterioration of the DC offset canceling accuracy. By this means, the accuracy in the DC offset canceling operation is improved.

In the possible structure which prevents the input of reception signal to the DC offset canceling circuit, for example, a circuit such as an amplifier for amplifying the reception signal is in the sleep state only during the DC offset canceling operation period, or bypassing operation of the reception signal is carried out by short-circuiting the input end of the circuit such as the amplifier for amplifying the reception signal, which is not used at the time of canceling operation.

According to the present invention, a receiver circuit comprises a demodulation means for converting a high frequency signal into a base band signal by means of a local oscillator signal, a gain control amplifier for amplifying an output signal from the demodulation means, a DC offset canceling means for calibrating an output DC offset of the gain control amplifier in response to a DC offset canceling signal, and a reception signal interrupt means to interrupt the high frequency signal to the demodulation means in response to the DC offset canceling signal.

In the structure, at the time of starting the DC offset canceling operation, the input of the high frequency signal to the demodulation means is interrupted. Therefore, the accuracy in the DC offset canceling operation is improved free from any influence of the high frequency signal as the reception signal.

In the receiver circuit of the above structure, for example, the reception signal interrupt means comprises an amplifier, having an active/sleep control terminal, amplifying a high frequency signal and inputting the amplified high frequency signal to the demodulation means. The amplifier is in a sleep state in response to the DC offset canceling signal.

Further, in another example, the reception signal interrupt means comprises a differential amplifier, amplifying a high frequency signal for inputting the amplified high frequency signal to the demodulation means. The differential amplifier has a shunt switch for short-circuiting a pair of differential input terminals. The differential amplifier turns on the shunt switch in response to the DC offset canceling signal.

In the receiver circuit, it may provide a plurality of circuit systems comprising a demodulation means; a gain control amplifier; a DC offset canceling means; and the reception signal interrupt means for receiving a plurality of frequency bands, and an antenna switch for selecting a circuit system using in correspondence with a frequency band between input portions of the circuit systems and the antenna. The antenna switch selects a supply destination of the input signal from the antenna in response to the DC canceling signal to a circuit system where DC offset canceling operation is not performed among the plurality of circuit systems.

In the receiver circuit, the reception signal interrupt means comprises an amplifier having an active/sleep control terminal and amplifying a high frequency signal, and a differential amplifier for amplifying the high frequency signal outputted from the amplifier, and inputting the amplified high frequency signal to the demodulation means. The differential amplifier has a shunt switch for short-circuiting differential signal input terminals in its circuit. The demodulator directly converts the high frequency signal outputted from the differential amplifier into a base band signal using the local oscillator signal outputted from the local oscillator. The amplifier is in the sleep state in response to the DC offset canceling signal, and the sleep state continues during the DC offset canceling operation period. The differential amplifier turns on the shunt switch in response to the DC offset canceling signal, and the ON state of the shunt switch continues during the DC offset canceling operation period.

Further, for example, the demodulation means comprises a local oscillator for generating a local oscillator signal and comprises a demodulator to which both the high frequency signal being outputted from the differential amplifier and the local oscillator signal being outputted from the local oscillator are inputted.

A band pass filter is provided between the amplifier and the differential amplifier. Further, a lowpass filter is provided on the output side of the gain control amplifier.

Next, solution means will be described with reference to FIG. 1. During the DC offset canceling operation period, a first low noise amplifier 102 is in the sleep state, and a second low noise amplifier 104 is not in the sleep state. A shunt switch 112 provided between a pair of differential signal input terminals is short-circuited to achieve interruption of the reception signal. The second low noise amplifier 104 is not in the sleep state, and the pair of differential signal terminals are short-circuited by the shunt switch 112 for the following reason.

One possible factor of the DC offset is a self-mixing caused by a leakage of the output signal of a local oscillator 106 to an input end of the demodulators 105_1, 105_2. Further, as a path of the leakage of the output of the local oscillator 106, it may be possible that the output of the local oscillator 106 leaked through the output end of the second low noise amplifier 104 and the input end of the demodulators 105_1, 105_2, is reflected at the output end of the second low noise amplifier 104, and leaks into the input of the demodulators 105_1, 105_2. Therefore, if those demodulators 105_1, 105_2, the local oscillator 106, and the second low noise amplifier 104 are put into the sleep state during the DC offset canceling operation period, the state of operation may differ from that of the actual operation environment, and the DC offset canceling operation may not be performed accurately. Thus, it is preferable that the demodulators 105_1, 105_2, the local oscillator 106, and the second low noise amplifier 104 are placed in the active state.

Further, in order to receive a plurality of frequency bands in the presence of a plurality of circuit systems including full components from the first low noise amplifier 102 to the low pass filters 109_1, 109_2, it is preferable to perform the process as state below. In addition to the interruption of the reception signal, the supply destination of the reception signal is preferably switched to a circuit system for another frequency band that is not subjected to DC offset canceling. In particular, the switch between the circuit systems and the antenna is selected. Thus, the reception signal is not supplied to the circuit system that is subjected to DC offset canceling. As a result, it is possible to cancel the DC offset by preventing the input of the reception signal to the circuit system that is subjected to the DC offset canceling. After the DC offset canceling for one of the circuit systems is performed, the subsequent DC offset canceling is performed for the other circuit systems successively.

The receiver circuit according to the present invention achieves the highly accurate DC offset canceling operation by interrupting the high frequency signal as a reception signal at the time of DC offset canceling operation of the wireless communication receiver circuit in the direct conversion system having the DC offset canceling function.

DESCRIPTION OF THE PREFERRED EMBODIMENTS

First Embodiment

Figure 1:
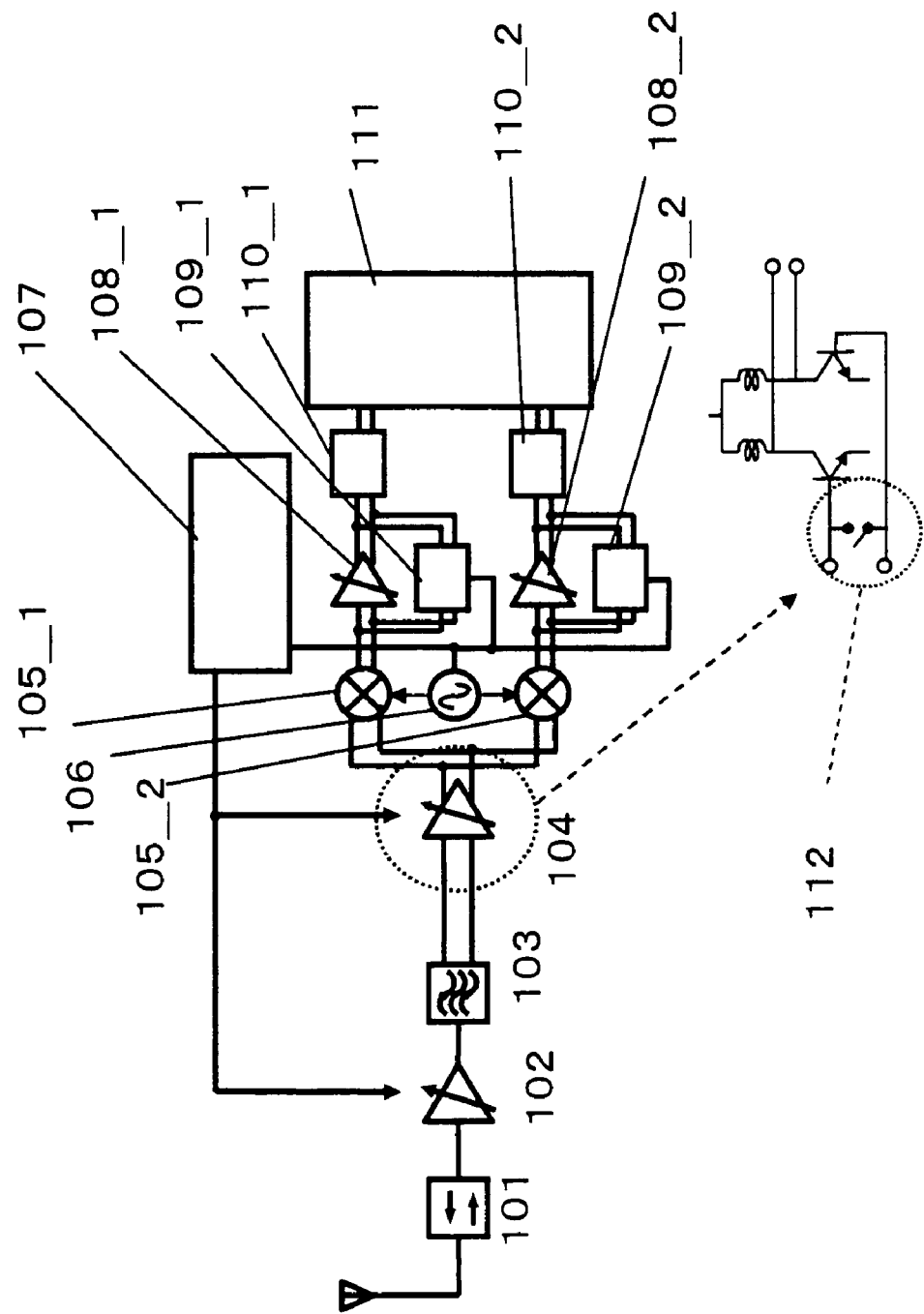
FIG. 1 is a block diagram showing a structure of a receiver circuit including a DC offset canceling circuit according to a first embodiment of the present invention.

Hereinafter, a first embodiment of the present invention will be described with reference to the drawings. FIG. 1 is a block diagram showing a structure according to the first embodiment of the present invention. In FIG. 1, a specific exemplary circuit of a second low noise amplifier 104 is also illustrated (see an arrow indicated by a broken line).

Figure 3:
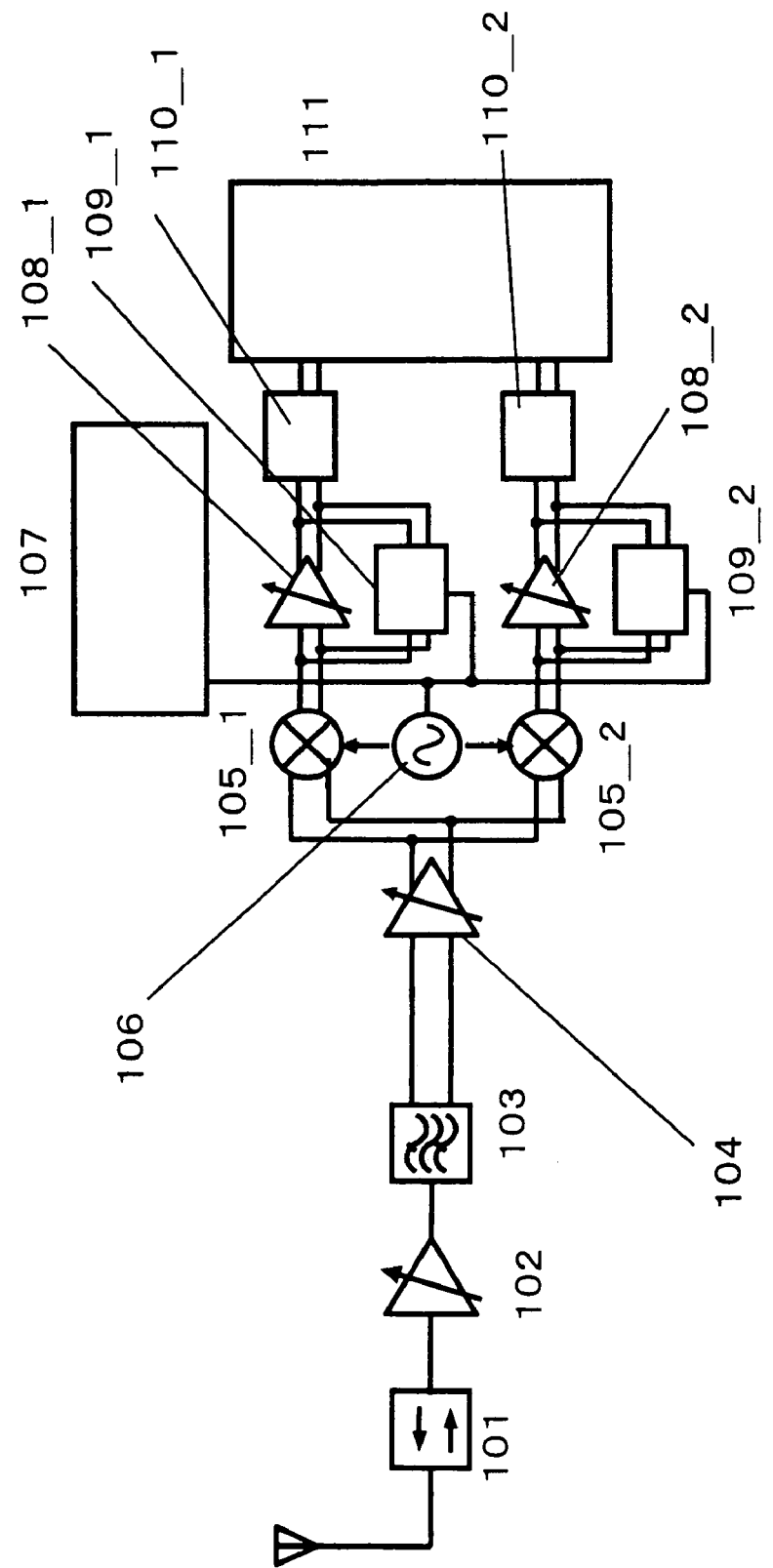
FIG. 3 is a block diagram showing a structure of a receiver circuit including a DC offset canceling circuit of a prior art.
Figure 4:
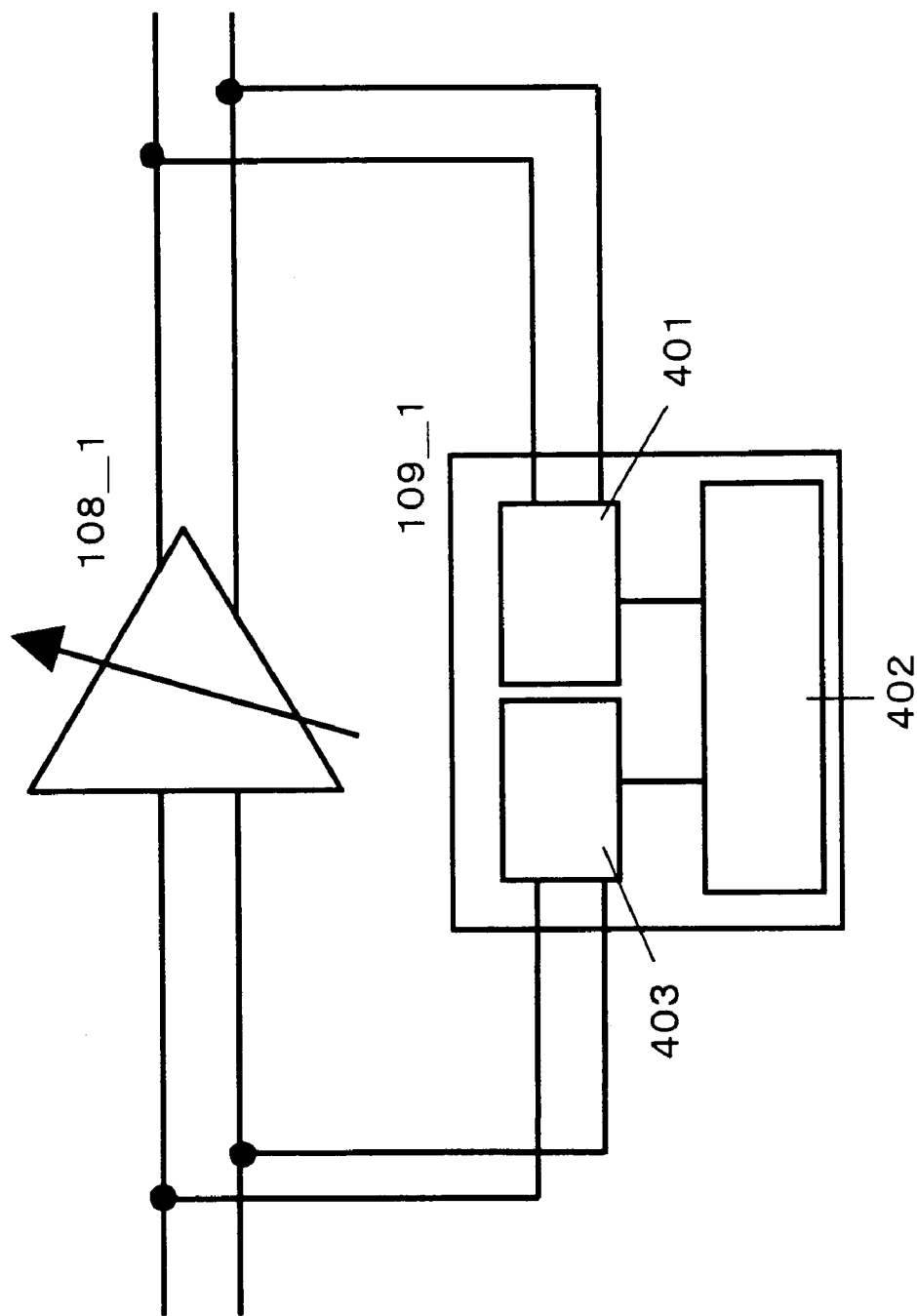
FIG. 4 is a block diagram showing a specific structure of the DC offset canceling circuit of the prior art.

In the receiver circuit according to this embodiment, the following structure is added to structure of the DC offset canceling circuit of the prior art shown in FIG. 3. Specifically, a shunt switch 112 is provided between a pair of differential signal input terminals of a second low noise amplifier 104 which works as a differential amplifier. Further, a first low noise amplifier 102 has an active/sleep control terminal for an external terminal. Further, a control terminal of the shunt switch 112 and the active/sleep control terminal of the first low noise amplifier 102 are connected to a control logic circuit 107. The other structure is similar to that of the prior art.

Next, operations of the receiver circuit will be described. When a DC offset canceling signal is outputted from the control logic circuit 107, the DC offset canceling signal is inputted to DC offset canceling circuits 109_1, 109_2 to start the DC offset canceling operation. The DC offset canceling signal from the control logic circuit 107 switches the shunt switch 112 of the upstream second low noise amplifier 104, i.e., turns on the shunt switch 112 to interrupt the reception signal. This state continues during the DC offset canceling operation period. At this time, the second low noise amplifier 104 is in the active state, and the downstream circuits are also in the active state.

The DC offset canceling signal switches the state in the active/sleep control of the first low noise amplifier 102, and sets the first low noise amplifier 102 in the sleep state. This state continues during the DC offset canceling operation period. Thus, during the DC offset canceling operation period, it is possible to prevent the input of the reception signal to the circuits posterior demodulators 105_1, 105_2. As a result, improvement in the accuracy in the DC offset canceling operation is achieved. The other operations are similar to those of the prior art.

Second Embodiment

Figure 2:
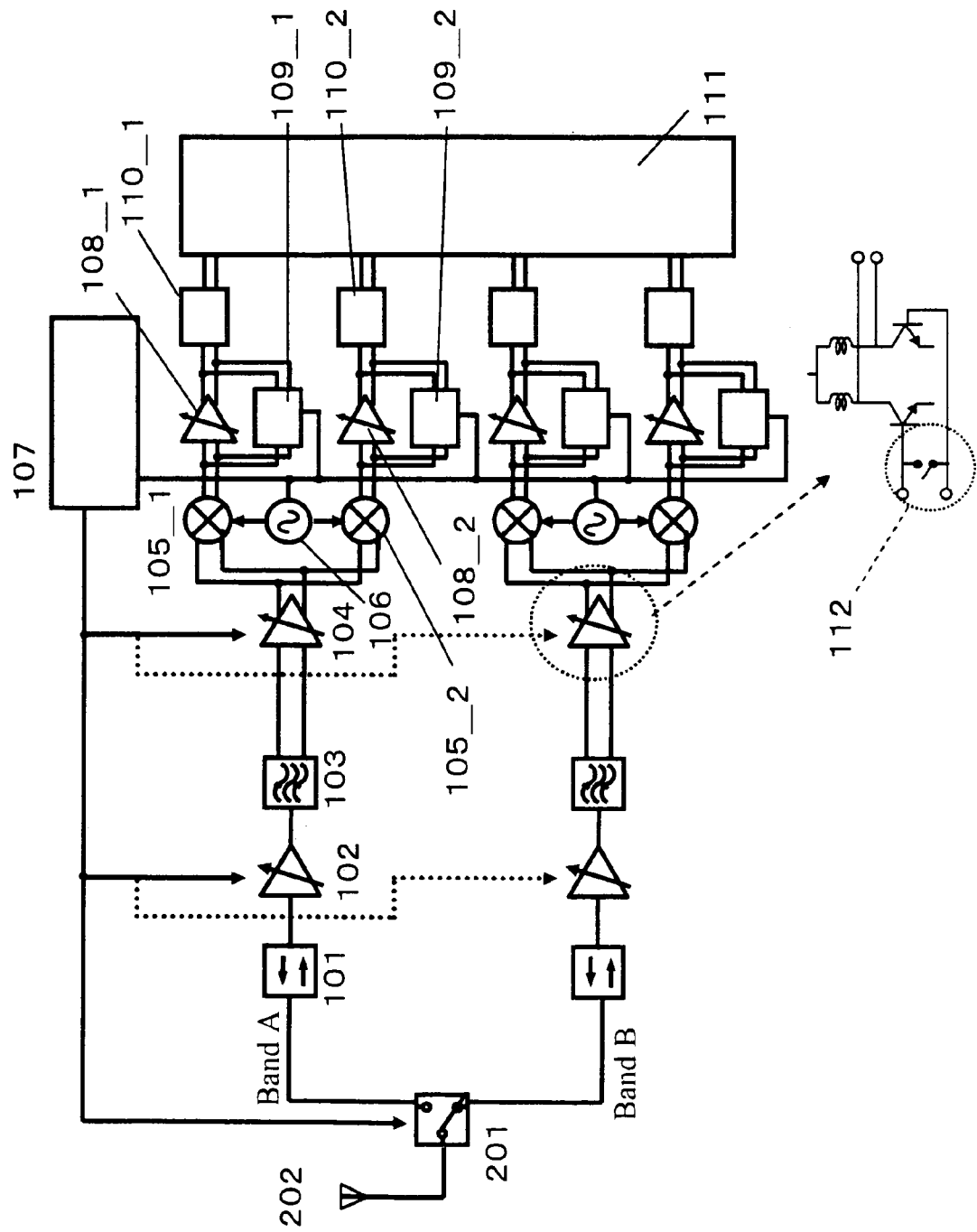
FIG. 2 is a block diagram showing a structure of a receiver circuit including a DC offset canceling circuit according to a second embodiment of the present invention.

Next, a second embodiment of the present invention will be described with reference to the drawings. In order to carry out processes in a plurality of frequency bands, the receiver circuit according to this embodiment is provided with a plurality of circuit systems each including a duplexer 101, a first low noise amplifier 102, a SAW filter 103, a second low noise amplifier 104, demodulators 105_1, 105_2, a local oscillator 106, gain control amplifiers 108_1, 108_2, DC offset canceling circuits 109_1, 109_2, and low pass filters 110_1, 110_2. In FIG. 2, the receiver circuit includes two circuit systems having the above structure. In FIG. 2, reference numeral is labeled to each block of only the band A. The band B is same as the band A, and thus, illustration of reference numeral for the band B is omitted.

In the embodiment, an antenna switch 201 is provided between an antenna 202 and the duplexer 101 of the circuit system of the band A, and the duplexer 101 of the circuit system of the band B.

Next, operations will be described. As with the first embodiment, the DC offset canceling start signal from the control logic circuit 107 controls the DC offset canceling circuits 109_1, 109_2, the second low noise amplifier 104, and the first low noise amplifier 102. At this time, the DC offset canceling start signal further controls the antenna switch 201.

At the time of canceling the DC offset of the gain control amplifiers 108_1, 108_2 of the circuit system of the band A, the antenna switch 201 selects the band B side. Likewise, at the time of canceling the DC offset in the circuit system of the band B, the antenna switch 201 selects the band A side. Then, the DC offset canceling operation is performed successively for each of the circuit systems of the band A and the band B.

In this manner, by supplying the reception signal to the circuit system where the DC offset canceling operation is not performed, it is possible to prevent the input of the reception signal to the circuit system where the DC offset canceling operation is performed. As a result, improvement in the accuracy of the DC offset canceling operation is achieved. The other effects are same as those of the first embodiment.

INDUSTRIAL APPLICABILITY

The receiver circuit according to the present invention interrupts the reception signal at the time of DC offset canceling operation to achieve the highly accurate DC offset canceling operation advantageously. Thus, the receiver circuit according to the present invention is useful as, e.g., the wireless communication receiver circuit of the direct conversion system.

What is claimed is:

1. A receiver circuit comprising:
   a demodulation section for converting a high frequency signal into a base band signal employing a local oscillator signal;
   a gain control amplifier for amplifying an output signal from the demodulation means;
   a DC offset canceling section for calibrating an output DC offset of the gain control amplifier in response to a DC offset canceling signal; and
   a reception signal interrupt section to interrupt the high frequency signal to the demodulation means in response to the DC offset canceling signal, wherein:
   the reception signal interrupt section comprises an amplifier, having an active/sleep control terminal, amplifying the high frequency signal and inputting the amplified high frequency signal to the demodulation section, and the amplifier is in a sleep state in response to the DC offset canceling signal.

2. The receiver circuit according to claim 1, wherein a lowpass filter is provided on the output side of the gain control amplifier.

3. A receiver circuit comprising:
   a demodulation section for converting a high frequency signal into a base band signal employing a local oscillator signal;
   a gain control amplifier for amplifying an output signal from the demodulation section;
   a DC offset canceling section for calibrating an output DC offset of the gain control amplifier in response to a DC offset canceling signal; and
   a reception signal interrupt section to interrupt the high frequency signal to the demodulation section in response to the DC offset canceling signal, wherein:
   the reception signal interrupt section comprises a differential amplifier, for amplifying the high frequency signal; inputting the amplified high frequency signal to the demodulation section; having a shunt switch for short-circuiting a pair of differential input terminals, and the differential amplifier turns on the shunt switch in response to the DC offset canceling signal.

4. The receiver circuit according to claim 3, wherein the demodulation section comprises a local oscillator for generating a local oscillator signal and a demodulator to which the high frequency signal, outputted from the differential amplifier, and wherein the local oscillator signal, outputted from the local oscillator, are inputted, and the demodulator directly converts the high frequency signal, outputted from the differential amplifier, into a base band signal using the local oscillator signal outputted from the local oscillator.

5. The receiver circuit according to claim 3, wherein a lowpass filter is provided on the output side of the gain control amplifier.

6. A receiver circuit comprising:
   a demodulation section for converting a high frequency signal into a base band signal employing a local oscillator signal;
   a gain control amplifier for amplifying an output signal from the demodulation section;
   a DC offset canceling section for calibrating an output DC offset of the gain control amplifier in response to a DC offset canceling signal; and
   a reception signal interrupt section to interrupt the high frequency signal to the demodulation section in response to the DC offset canceling signal, further comprising:

a) a plurality of circuit systems, each comprising the demodulation section, the gain control amplifier, the DC offset canceling section, and the reception signal interrupt section, are provided for achieving a reception of a plurality of frequency bands, and b) an antenna switch, for selecting a circuit system in correspondence with a frequency band, is provided between input portions of the circuit systems and the antenna, and selects a supply destination of the input signal from the antenna, in response to the DC canceling signal, to a circuit system, wherein DC offset canceling operation is not performed, in the plurality of circuit systems.

7. The receiver circuit according to claim 6, wherein a lowpass filter is provided on the output side of the gain control amplifier.

8. A receiver circuit comprising:

a demodulation section for converting a high frequency signal into a base band signal employing a local oscillator signal;

a gain control amplifier for simplifying an output signal from the demodulation section;

a DC offset canceling section for calibrating an output DC offset of the gain control amplifier in response to a DC offset canceling signal; and a reception signal interrupt section to interrupt the high frequency signal to the demodulation section in response to the DC offset canceling signal, wherein:

the reception signal interrupt section comprises an amplifier having an active/sleep control terminal and amplifying the high frequency signal, and a differential amplifier for amplifying the high frequency signal outputted from the amplifier, and inputting the amplified high frequency signal to the demodulation section, the differential amplifier having a shunt switch for short-circuiting differential signal input terminals in its circuit;

the amplifier is placed in a sleep state in response to the DC offset canceling signal, and the sleep state continues during the DC offset canceling operation period; and the differential amplifier turns on the shunt switch in response to the DC offset canceling signal, and an ON state of the shunt switch continues during the DC offset canceling operation period.

9. The receiver circuit according to claim 8, wherein a band pass filter is provided between the amplifier and the differential amplifier.

* * * * *